Patented Jan. 16, 1951

2,538,002

UNITED STATES PATENT OFFICE 2,538,002

CONTAINER FOR AND PROCESS OF PRE-
SERVING PERISHABLE FOODSTUFFS

Carroll R. Irons and George W. Stanton, Midland, Mich., assignors to The Dow Chemical Company, Midland, Mich., a corporation of Delaware No Drawing. Application November 29, 1947,
Serial No. 788,974

1 Claim. (Cl. 229—53)

This invention relates to a particular heat-shrinkable container for packaging foodstuffs preparatory to storage or freezing, and to a method whereby such container may be used.

The use of a stretched and heat-shrinkable envelope or bag of unvulcanized rubber for packaging and preserving foodstuffs to be stored or frozen has been disclosed by De Poix in U. S. Patents 2,240,245 and 2,376,583. Such bags are disclosed by the said patents as being made by electro-deposition of unvulcanized rubber from latex on a suitable form, the bag is stripped from the form and is stretched pneumatically to a size larger than the article which it is intended to contain, and becomes temporarily "racked," i. e. if kept cool it retains its enlarged dimensions. Food is placed in the bag, which is then evacuated and finally subjected to heat to cause the bag to shrink in an attempt to regain its original size. The bag thereby is caused to conform closely to the enclosed article, and, being quite inelastic, affords considerable protection even if it is accidentally punctured, as it does not tend to pull away from the resulting opening and expose large areas of the contents.

Some packers do not have facilities for stretching the unvulcanized rubber bags. This is especially true of those who may package foods this way only occasionally or in small quantities, and for whom even small capital investments in special equipment are unwarranted. For such users, a previously stretched bag of unvulcanized rubber is available commercially. It has been found, however, that such bags do not retain their racked condition indefinitely, and that great care must be taken to insure that stretched unvulcanized rubber bags are stored and shipped, before use, under carefully controlled conditions. It has even been found that exposure of such bags to summer heat results in marked shrinkage and reduction in utility.

It would be preferable to have a bag capable of performing the functions of the unvulcanized rubber bags, but which exhibits no tendency to shrink at any temperature encountered in shipment and storage, even of long duration. It must, of course, be capable of being shrunk sufficiently to fit snugly about the article being packed therein. For greatest utility, it should shrink from 30 to 50 per cent when exposed briefly to a temperature between 85° and 100° C. It should not communicate any odor or taste to the packed food. It should be inelastic both before and after shrinking. If possible, it should be clear and transparent, rather than having the bare translucence of unvulcanized rubber bags. Finally, it must be capable of being stored for prolonged periods at freezing temperatures without becoming brittle, if such storage should be necessary.

It is known by X-ray diffraction studies that certain copolymers of vinylidene chloride are crystalline. It is also known that they may be formed into films wherein the submicroscopic crystallites are aligned parallel to the film surface (which condition may be referred to as "planar orientation"), by extruding the fused copolymer, cooling it to or below room temperature to provide a temporarily noncrystalline or supercooled form thereof, and stretching to effect crystallization and orientation. Such oriented crystalline films are known to shrink when heated to a temperature approaching the softening point. The strength and transparency of crystalline vinylidene chloride copolymer films, in the stretched and oriented condition, are much greater than those of unvulcanized rubber, and such films are quite inelastic. If one or more of them can be found which can be made to shrink the desired 30 to 50 per cent or more at a moderate and readily producible temperature up to the boiling point of water, it might prove useful for the intended purpose.

It is an object of the present invention to provide a bag or pouch for packaging foodstuffs, which exhibits no tendency to shrink under any conditions normally encountered in shipment and storage, which is capable of shrinking from 30 to 50 per cent or more when heated to a temperature of 85° to 100° C., which does not become brittle at freezing temperatures, which is substantially inelastic, and which does not contribute any odor or taste to food packed in contact therewith. A related object is to provide such a bag composed of a crystalline copolymer of vinylidene chloride. A further object is to provide a process for packaging foods in such a bag preparatory to storage or freezing. Another object is to provide an article of food, packed snugly in such a bag.

In accordance with the present invention the foregoing objects may be attained and a bag having the desired characteristics may be prepared from a particular copolymer of vinylidene chloride and acrylonitrile. The bag of the invention is made of a copolymer of from 90 to 92 per cent vinylidene chloride and correspondingly from 10 to 8 per cent acrylonitrile and is preferably made from a copolymer containing from 90.4 to 90.9 per cent vinylidene chloride and complementarily from 9.6 to 9.1 per cent acrylonitrile. Copolymers within the stated narrow ranges of proportions may be extruded, preferably in tubular form, and stretched both radially and longitudinally, to form a flexible, transparent film from which bags or pouches may be made having the desired characteristics. Other copolymers of vinylidene chloride and acrylonitrile, i. e., those having less than 90 per cent or more than 92 per cent vinylidene chloride in the copolymer, do not form films having the required shrinkage characteristics. For example, a copolymer of 88 per cent vinylidene chloride and 12 per cent acrylonitrile is too amorphous and cannot be formed into the desired type of film by a process of extrusion and blowing. Similarly, a copolymer of 93 per cent or more vinylidene chloride and 7 per cent or less acrylonitrile is too highly crystalline and when extruded and cold-stretched to produce a strong flexible film must be heated to a temperature considerably above the boiling point of water to effect the required amount of shrinkage. Such a film would be impractical for use by small packers even if it had the other required characteristics. The films which are too highly crystalline for the present use shrink less than 20 per cent at temperatures up to 100° C. They must be heated to temperatures of about 140° C. or higher in order to provide sufficient shrinkage for the intended use.

The narrow range of copolymers which find use in the present invention may be produced, for example, by polymerizing a corresponding mixture of the monomers in aqueous emulsion, suitably with a redox catalyst, until polymerization is at least 80 per cent complete, and recovering the copolymer from the resulting latex-like dispersion. The copolymers are most easily fabricated by extrusion after being mixed with a small amount of plasticizer and with a heat stabilizer to prevent thermal degradation during extrusion, although it is not essential that the plasticizer or stabilizer be left in the film from which the bag or pouch is made. Various plasticizers which may be used are known in the art. As examples there may be mentioned dibutyl sebacate and dioctyl sebacate. A satisfactory heat stabilizer for use during the extruding operation is tetrasodium pyrophosphate.

With ordinary care in shipping and storage, the highest temperature to which the bags of the present invention may be subjected prior to use will not exceed about 50° C. 122° F.). At such a temperature, these bags show no tendency to shrink. In contrast thereto, a previously stretched unvulcanized rubber bag, at a temperature of 50° C., undergoes considerable shrinkage, and if such a temperature condition persists, the rubber bags return to their original unstretched dimensions. Accordingly, the present bags may be shipped in any climate and stored until needed without change in dimension. Since, in addition, they exhibit no tackiness or self-sealing tendencies at temperatures below 100° C., no special precautions need be observed in storage to prevent cohesion between contiguous bags in a bundle, or between opposed faces of the same bag.

The new bags are impervious to water in both the liquid and the vapor state, so they may be used safely to pack foods with liquid components (e. g., meat and gravy or fruits in syrup) as well as such hydrous foods as raw meat, fresh fruits and vegetables, and the like, without danger of dehydration during storage, either at moderate temperatures or under the normally dehydrating conditions of storage in a refrigerator or freezer.

As stated, the bags are prepared by extrusion of the hot copolymer in tubular form, followed by a cooling step to produce the temporarily non-crystalline and ductile supercooled state in the copolymer, in which state it is capable of being cold-worked to effect recrystallization. The supercooled tube is expanded pneumatically in a radial direction and is stretched mechanically (as between stretching rollers) along its longitudinal axis, nearly to the limit of which it is capable without rupture. This is about 3 to 5 times its diameter as extruded, and about 2 to 4 times its extruded length per unit weight. When this amount of distention occurs, the tube is no longer supercooled, and the submicroscopic crystallites are found, by X-ray diffraction studies, to be highly oriented in the sense that they lie in the plane of the film and not vertical to the film surface. Further stretching requires a much greater force than that required to effect crystallization, and results in no more than about 10 per cent further change in dimension which is lost immediately when such tension is released. Usually, however, application of such additional tension results in rupture of the film tube. The stretched and oriented tube may be cut to the desired length, and bags or pouches may be prepared by sealing one end of each length of cut tube. Sealing is preferably accomplished by flattening the tube and heating the end thereof to a fusion temperature for about one second, under moderate pressure. This may be done in any of several types of heat-sealing machines, or it may be done by pressing the end of the tube with a hot iron. The resulting weld is usually at least as strong as the rest of the bag and remains sealed during subsequent filling and shrinking of the bag. The bags may be made, if desired, with projections or pockets or other special shapes, by welding the flattened tube along desired contour lines, to adapt the container to special uses, such as packaging articles of irregular shape, such as the legs or carcasses of animals.

The method of the invention is carried out by placing the food to be protected in one of the described bags of a size just slightly larger than the food, expressing or evacuating air from the package, sealing the open end thereof, suitably by welding as with a hot iron or by twisting and tying the end portion, and heating the sealed package to a temperature between 85° and 100° C., to shrink the bag about the enclosed food. The shrinking operation is most conveniently and effectively carried out by immersing the sealed package in water heated to the stated temperature range. Facilities for the packaging operation are available wherever food may be packed for storage.

The following example illustrates the practice of the invention:

*Example*

A copolymer having an analysis of 90.6 per cent vinylidene chloride and 9.4 per cent acrylonitrile was prepared by polymerizing together 1188 pounds of vinylidene chloride monomer and 132 pounds of acrylonitrile in 3300 pounds of water containing 26.4 pounds of the sodium salt of the dihexyl ester of sulfosuccinic acid, 1312 pounds of 30 per cent hydrogen peroxide and sufficient ferric nitrate to provide 14 parts of iron per million parts of the mixed monomers. The mixture was emulsified and was held at 45° C. for 22 hours at which time polymerization was 80 per cent complete. The polymer was coagulated from its latex, and was washed and dried. It was plasticized with 10 per cent of its weight of dibutyl sebacate and was stabilized with 2.0 per cent of tetrasodium pyrophosphate. The resulting composition was extruded through tube-forming orifices of various diameters into a water bath at 20° C. to supercool the tube, which was then conducted between 2 pairs of pinch rollers, the second set operating at a peripheral speed of 3 times that of the first set. The tube was also distended radially between the two sets of rollers by means of a trapped air bubble which increased the tube diameter about fourfold. The so-stretched crystalline film, in tubular form, was cut transversely to various lengths. One end of each length of film tube was sealed by flattening the tube and heating the end briefly to 150° C., under moderate pressure. Test specimens of the film were found to shrink about 45 to 50 per cent when heated in water at 85° C. and to remain flexible at temperatures of —40° C. and lower. Cuts of meat, such as roasts, legs, quarters, and whole carcasses of lamb, chickens and the like, as well as numerous other types of food, including fruits, vegetables, and cheeses, could be fitted into bags of appropriate dimension, and sealed in, suitably after evacuation; by heating the open end in the manner described above. After such a sealed package had been prepared, the entire package was immersed briefly, for a period of from 10 seconds to one minute, in water at a temperature of 85° to 100° C. The film thereupon shrank down upon the contents of the package, forming a tight, compressive, inelastic wrapper thereon which was itself odorless and which contributed no taste or odor to the packed food.

The bags, envelopes or pouches of the present invention (often referred to herein simply as "bags") are most useful when the wall thickness thereof is of the order of 1.5 to 4 mils, though thicknesses of 0.5 or 1.0 mil are also useful. In these thicknesses they are both flexible and tough, and occupy little space when shipped in large quantities. Since the oriented crystalline copolymer bags are highly impermeable to water and its vapor, and remain flexible at very low temperatures encountered in food freezers, can be stored without shrinkage at summer temperatures and yet shrink readily at 85° to 100° C., they represent a marked improvement over other bags heretofore known for similar purposes.

While probably the greatest need for a close fitting moisture impervious wrapping about a food product is encountered with those foods which must be refrigerated or frozen in order to be preserved, this is not the only use for such wrappings. Many foods which can be stored at ordinary room temperature should either be protected from dehydration or must be tightly wrapped in order to prevent mold growth or bacterial contamination. Examples of such foods are cheese, fish and smoked or spiced meats, such as bacon, ham, salami and the like. These and numerous other foods which may be packed according to the method of the present invention in the new type of heat-shrinkable bag do not require refrigeration for their satisfactory preservation. All that is required of the packaged food is that it be stored at a beneficial temperature.

We claim:

A flexible bag, suitable for enclosing foodstuffs, made of a copolymer of from 90 to 92 per cent vinylidene chloride and correspondingly from 10 to 8 per cent acrylonitrile, wherein the submicroscopic crystallites have planar orientation, characterized by retention of dimensions at temperatures up to 50° C. and by shrinking at least 30 per cent when heated in water at 85° to 100° C.

CARROLL R. IRONS.
GEORGE W. STANTON.

REFERENCES CITED

The following references are of record in the file of this patent:

UNITED STATES PATENTS

| Number | Name | Date |
| --- | --- | --- |
| 2,233,442 | Wiley | Mar. 9, 1941 |
| 2,238,020 | Hanson | Apr. 8, 1941 |
| 2,420,310 | Goodman | May 13, 1947 |